United States Patent [19]
Fujii et al.

[11] Patent Number: 5,368,450
[45] Date of Patent: Nov. 29, 1994

[54] SWASH PLATE TYPE COMPRESSOR

[75] Inventors: Toshiro Fujii; Kazuaki Iwama; Hitoshi Inukai, all of Kariya, Japan

[73] Assignee: Kabushiki Kaisha Toyoda Jidoshokki Seisakusho, Kariya, Japan

[21] Appl. No.: 101,927

[22] Filed: Aug. 4, 1993

Related U.S. Application Data

[63] Continuation-in-part of Ser. No. 101,178, Aug. 3, 1993.

Foreign Application Priority Data

Aug. 7, 1992 [JP] Japan ................. 4-211163

[51] Int. Cl.$^5$ ............................................. F04B 1/12
[52] U.S. Cl. ................................... 417/269; 92/154; 184/6.17
[58] Field of Search ................. 417/269; 92/154; 184/6.17; 91/502, 480, 490

[56] References Cited

U.S. PATENT DOCUMENTS

| | | | |
|---|---|---|---|
| 3,057,545 | 10/1962 | Ransom et al. | 417/269 |
| 3,220,353 | 11/1965 | Gregor | 91/490 |
| 5,044,892 | 9/1991 | Pettitt | 184/6.17 |
| 5,081,908 | 1/1992 | McBeth et al. | 91/499 |
| 5,172,623 | 12/1992 | Poisson | 417/269 X |
| 5,178,521 | 1/1993 | Ikeda et al. | 184/6.17 |

FOREIGN PATENT DOCUMENTS

| | | | |
|---|---|---|---|
| 4239971 | 6/1993 | Germany | 417/269 |
| 392587 | 4/1991 | Japan . | |

*Primary Examiner*—Richard A. Bertsch
*Assistant Examiner*—M. Kocharov
*Attorney, Agent, or Firm*—Brooks Haidt Haffner & Delahunty

[57] ABSTRACT

A swash plate type compressor comprises a cylinder block having formed therein a compartment accommodating therein a swash plate and a plurality of axial cylinder bores each receiving therein a reciprocally movable double-headed piston. The compressor further comprises a drive shaft having formed therein a discharge passage in communication with front and rear discharge chambers in front and rear housings, respectively, which are fastened to the axial ends of the cylinder block. The drive shaft is supported by a pair of front and rear tapered roller bearings and these two bearings are arranged in such a way that at least part of refrigerant gas discharged into either one of the discharge chambers flows through both of the front and rear bearings so that the bearings are lubricated by oil contained in and entrained by the refrigerant gas.

19 Claims, 6 Drawing Sheets

SWASH PLATE TYPE COMPRESSOR

This application is a continuation-in-part of co-pending U.S. application Ser. No. 08/101,178 filed on Aug. 3, 1993, which is incorporated herein by reference.

FIELD OF THE INVENTION

The present invention relates to a multi-cylinder. swash plate type refrigerant compressor for use in an automotive air conditioning system.

BACKGROUND OF THE INVENTION

Swash plate type refrigerant compressor of a typical structure is disclosed, e.g., by Publication of Japanese Patent Application No. 3-92587 (1991), which includes front and rear cylinder blocks axially combined together to form a cylinder block assembly and having defined therein a plurality of pairs of aligned cylinder bores, a reciprocable double-headed piston fitted in each paired cylinder bores front and rear housings bolted to the axial ends of the cylinder block assembly with a valve plate interposed between each housing and its adjacent cylinder block assembly end. The compressor further includes a drive shaft which is rotatably supported in the cylinder block assembly by a pair of front and rear radial bearings, and a swash plate fixedly mounted on the drive shaft at an angle of inclination for rotary wobbling movement in a swash plate compartment in the cylinder block assembly. The swash plate compartment communicates with a gas inlet fitting provided on the cylinder block assembly and connected to an external conduit through which refrigerant gas under a suction pressure is supplied to the compressor. Each double-headed piston is engaged with the swash plate by way of a pair of front and rear hemispherical shoes in such a way that the wobbling movement of the swash plate is converted into reciprocating movement of the piston in its associated paired cylinder bores.

A pair of front and rear suction chambers are defined by the front and rear housings and their adjacent valve plates, respectively, and the swash plate compartment filled with refrigerant gas under a suction pressure is connected with these front and rear suction chambers through a plurality of suction passages formed to extend axially through the respective cylinder blocks between any two circumferenially adjacent cylinder bores. Similarly, a pair of front and rear discharge chambers are formed on opposite ends of the compressor by the housings and the valve plates, respectively. These two discharge chambers are connected to each other by way of a plurality of discharge passages extending axially through the cylinder block assembly so that compressed refrigerant gas discharged into one of the discharge chambers flows into the other discharge chamber, from where it is delivered out of the compressor together with refrigerant gas forced out directly into the above other discharge chamber.

It is to be noted that, for any given diameter of cylinder bores in a compressor, the bores should be arranged and spaced apart circumferentially from each other in the cylinder block assembly at such a spaced distance that maintains the desired wall thickness between any two circumferentially adjacent cylinder bores for ensuring the overall strength and durability of the cylinder block assembly. Arranging cylinder bores radially toward the outer periphery of the cylinder block assembly with an attempt to increase the wall thickness will enlarge the assembly radially, thereby making the compressor itself disadvantageously larger in size. On the other hand, if the cylinder bores are arranged toward the axial center of the cylinder block assembly with an attempt to reduce the compressor size, the compressor strength will be in turn deteriorated by the reduction wall of thicknesses between the bores. As understood by those skilled in the art, the suction and discharge passages formed in the cylinder blocks are disadvantageous in that the presence of such passages reduces the wall thickness and, therefore, it is difficult to maintain the cylinder block assembly strength while achieving compactness of the compressor. The suction passages offer resistance against the flow of refrigerant gas to be admitted into the cylinder bores and, therefore, causes a pressure loss of the gas passing therethrough, thereby affecting the working efficiency of the compressor.

The above-cited compressor further includes another pair of bearings mounted on the drive shaft on opposite sides of the swash plate for receiving thrust pressure exerted by the drive shaft. Apparently, the use of two pairs of bearings is not only costly, but also complicates the compressor construction and hence takes more time and trouble to assemble the same.

SUMMARY OF THE INVENTION

It is an object of the present invention, therefore, to provide a swash plate type refrigerant compressor which is advantageous in constructing the compressor compact in size while maintaining its strength.

It is another object of the invention to provide a compressor which is easier to assemble by reducing the number of bearings for use in the compressor.

It is still another object of the invention to provide a compressor in which the bearings are so disposed that they are lubricated by oil contained in and entrained by refrigerant gas flowing in the compressor.

The above objects of the invention can be accomplished by a swash plate type compressor which comprises a cylinder block having formed therein a compartment accommodating therein a swash plate and a plurality of cylinder bores each receiving therein a reciprocally movable double-headed piston. The compressor further comprises a drive shaft having formed therein an axial discharge passage in communication with front and rear discharge chambers in front and rear housings, respectively, which are fastened to the axial ends of the cylinder block. The drive shaft is supported by a pair of front and rear tapered roller bearings which are disposed in such a way that at least part of refrigerant gas discharged into one of the discharge chambers flows through both of the front and rear bearings so that the bearings are lubricated by oil contained in the refrigerant gas flowing in the compressor.

In one embodiment of the compressor according to the invention, it further includes a valve plate disposed between each of the housings and its adjacent axial end of the cylinder block and having formed at its center a bore for supporting therein the bearing. The bearing is disposed in the bore such that a spatial region is formed on the axially inner side of the bearing, and the valve plate is formed therein with a fluid passage connecting the discharge chamber and that spatial region. Each bearing is located between its adjacent discharge chamber and the axial discharge passage of the drive shaft so that all of the refrigerant gas discharged into one of the discharge chambers flows through both of the front and rear bearings.

In another preferred embodiment of the invention, the front and rear bearings are accommodated in bores formed centrally in the cylinder block such that each bearing is located between its adjacent discharge chamber and a spatial region which is defined on the opposite side of the bearing with respect to the discharge chamber. The spatial region is in communication with the axial discharge passage of the drive shaft through radial holes so that part of refrigerant gas discharged into one of the discharge chambers flows through both of the front and rear bearings.

The rear tapered roller bearing has an inner race whose axial inner end is in abutment contact with a shoulder portion formed on the drive shaft and an outer race whose axially outer end is supported by the rear housing in abutment contact therewith and, on the other hand, the front bearing has an inner race whose axially end is in abutment contact with another shoulder portion on the drive shaft and an outer race whose axially outer end is supported by preloading means such as a spring which is disposed between that outer race of the front bearing and the front housing so that thrust pressure of the drive shaft is received by the housings via the bearings.

In the above one preferred embodiment, the compressor further includes a pair of front and rear suction valves accommodated in bores formed centrally in the cylinder block. respectively. Each suction valve is mounted on the drive shaft for rotation therewith and having formed therein a fluid passage in communication with the swash plate compartment and operable to bring its fluid passage in communication with the cylinder bores successively in synchronism with rotation of said drive shaft.

The above and other objects and features of the invention will be apparent from the following detailed description of the preferred embodiment thereof in conjunction with the accompanying drawings.

DETAILED DESCRIPTION OF PREFERRED EMBODIMENTS

The following will describe a preferred embodiment of swash plate type refrigerant compressor of the present invention with reference to FIGS. 1 to 5.

Figure 1:
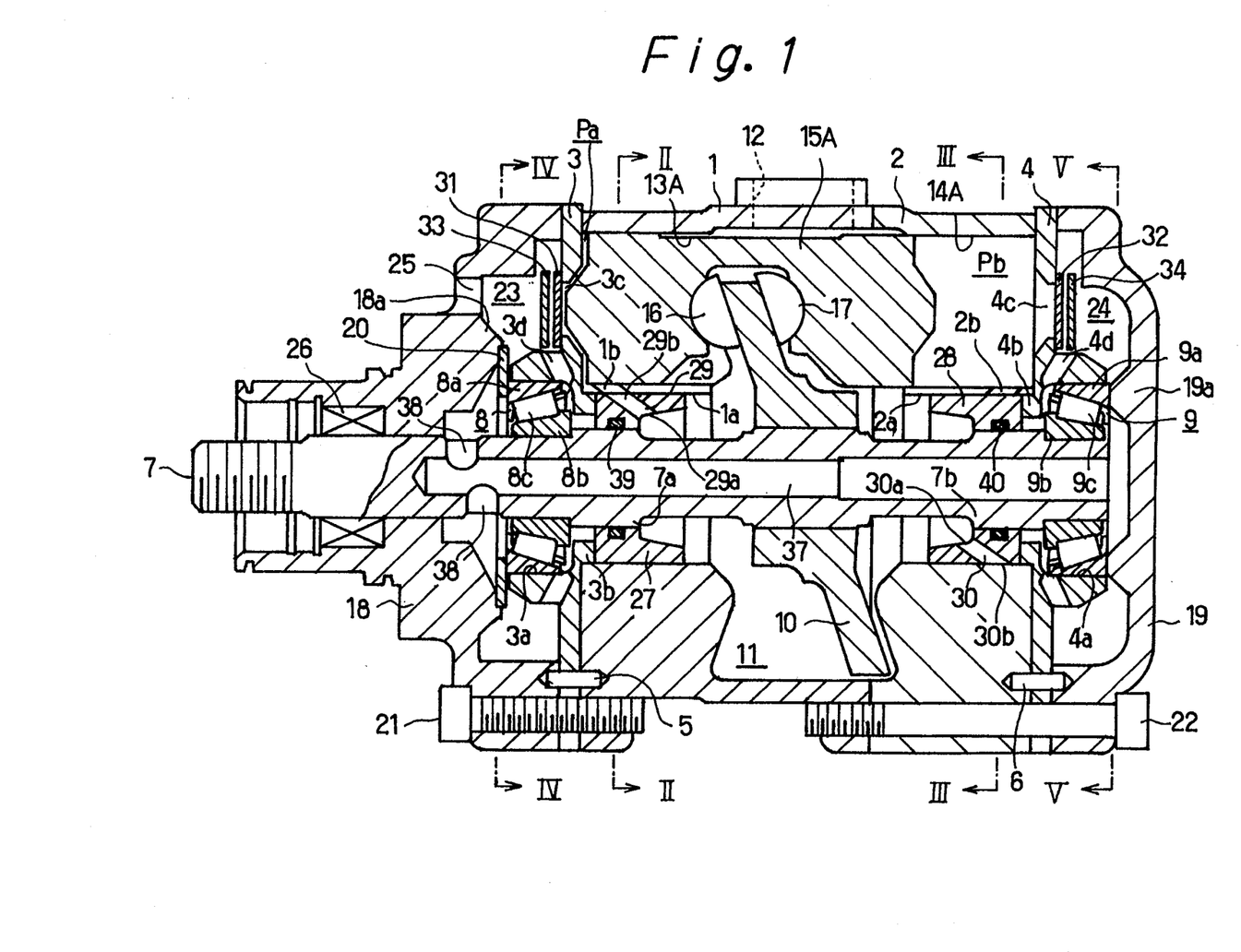
FIG. 1 is a longitudinal cross-sectional view of a multi-cylinder, swash plate type refrigerant compressor constructed according to the present invention.

Referring firstly to FIG. 1, there is illustrated a compressor constructed according to the present invention, which includes a pair of front and rear cylinder blocks 1, 2 sealingly combined together to provide a cylinder block assembly and cooperating to form therein a desired number of pairs (five pairs in the embodiment as seen clearly in FIGS. 2 and 3) of front and rear cylinder bores 13, 14 (13A, 14A) which are angularly equally spaced round and in parallel to a drive shaft 7 rotatably supported by a pair of front and rear tapered roller bearings 8, 9. The front and rear cylinder bores 13, 14 of each pair are axially aligned to form a single cylinder bore receiving therein a double-headed, or double-acting piston 15 (15A) fitted for reciprocal sliding movement in its associated paired cylinder bores. The cylinder blocks 1, 2 are formed with two central bores 1a, 2a for accommodating therein rotary type suction valves 27, 28 mounted on enlarged sections 7a, 7b of the drive shaft 7. These suction valves will be described in detail in a later part hereof.

The compressor further includes a front housing 18 which is sealingly fastened to the front end of the cylinder block assembly by a plurality of bolts 21 with a valve plate 3 interposed between the housing and the cylinder block assembly front end. Similarly, a rear housing 19 is clamped to the rear end of the assembly together with a valve plate 4 by a plurality of bolts 22. The valve plates 3, 4 have annular projections defining central bores 3a, 4a for supporting therein the tapered roller bearings 8, 9, and annular portions 3b, 4b protruding radially inward to provide annular shoulder portions which are engaged with outer peripheral edges of the respective suction valve accommodating bores 1a, 2a to locate the valve plates radially with respect to cylinder block assembly. Locating pins 5, 6 are inserted through holes drilled in the cylinder blocks 1, 2, valve plates 3, 4 and housings 18, 19 to keep the valve plates from rotating. Each of the bearings 8, 9 has an inner race 8b, 9b fixedly installed on the drive shaft 7 in abutment contact with an annular shoulder portion formed at the outer end of the enlarged section 7a, 7b on the drive shaft 7, an outer race 8a, 9a in sliding contact with the periphery of the bore 3a, 4a and a plurality of rollers 8c, 9c fitted between the outer and inner races in an outwardly-tapered disposition. As seen in FIG. 1, each of the outer races 8a, 9a is so sized that its axial outer end extends beyond the outer end of the annular projection defining the bearing supporting bore 3a, 4a in the valve plate 3, 4.

The front and rear cylinder blocks 1, 2 cooperate to define therein a compartment 11 for accommodating therein a circular swash plate 10. The swash plate 10 is fixedly mounted on the drive shaft 7 at a predetermined angle of inclination so that the plate makes a rotational wobbling movement in its compartment 11 when driven to rotate by the drive shaft. The swash plate 10 drivably engages the center of each double-headed piston 15 by way of a pair of front and rear hemispherical shoes 16, 17 such that the rotational wobbling movement of the swash plate caused by rotation of the drive shaft 7 is converted into reciprocal movement of the piston in its corresponding paired cylinder bores, thus variablevolume fluid working chambers P (Pa, Pb) being formed on opposite sides of the double-headed piston 15 (15A).

There is provided a refrigerant gas inlet fitting on the periphery of the front cylinder block 1, whose port 12 is connected on one hand to an external refrigerant gas conduit (not shown) and on the other to the swash plate compartment 11. Thus, the swash plate compartment 11 is filled with refrigerant gas under suction pressure and, therefore, it serves also as a suction chamber of the compressor.

The rear housing 19 has on its inner surface an annular projection 19a formed integrally therewith in abutment engagement with the outer race 9a of the rear tapered roller bearing 9. The front housing 18 is also formed on its inner surface with an annular projection 18a, and there is provided between that projection and the front tapered roller bearing 8 an annular preloading spring 20 with its outer peripheral edge held by annular shoulder portion of the projection 18a and its inner peripheral edge set in abutment with the outer race 8a of the front bearing. The spring 20 is yieldably deformed when the front housing 18, valve plate 3 and cylinder block 1 are tightened together by the bolts 21, thereby providing an axial preload to the drive shaft 7 via the bearing 8. By so arranging, thrust pressure exerted by the drive shaft rightward, as viewed in FIG. 1, is received by the rear housing by way of the bearing 9 and thrust pressure acting in opposite direction is carried by the front housing 18 by way of the front bearing 8 and the preloading spring 20.

Figure 4:
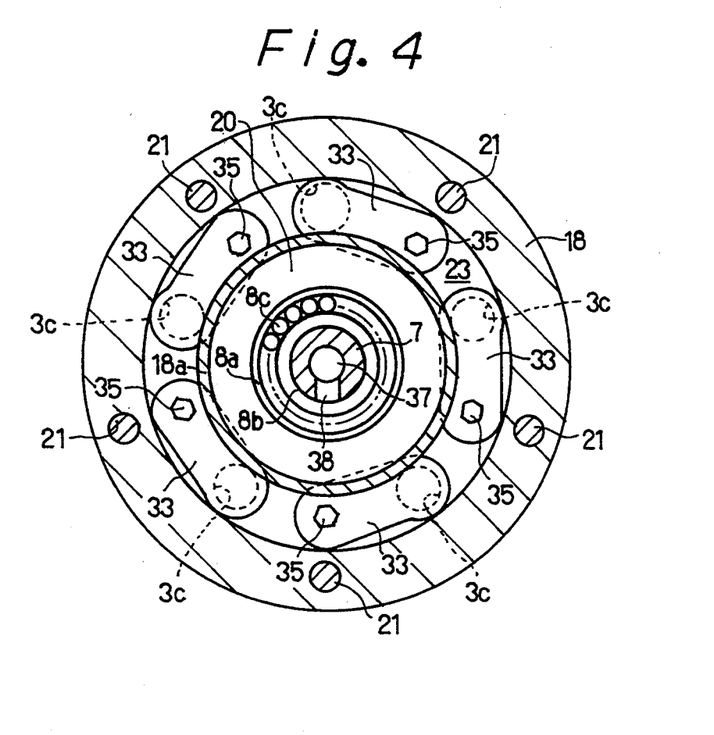
FIG. 4 is a cross-sectional view taken along line IV—IV of FIG. 1 through a front housing of the compressor.
Figure 5:
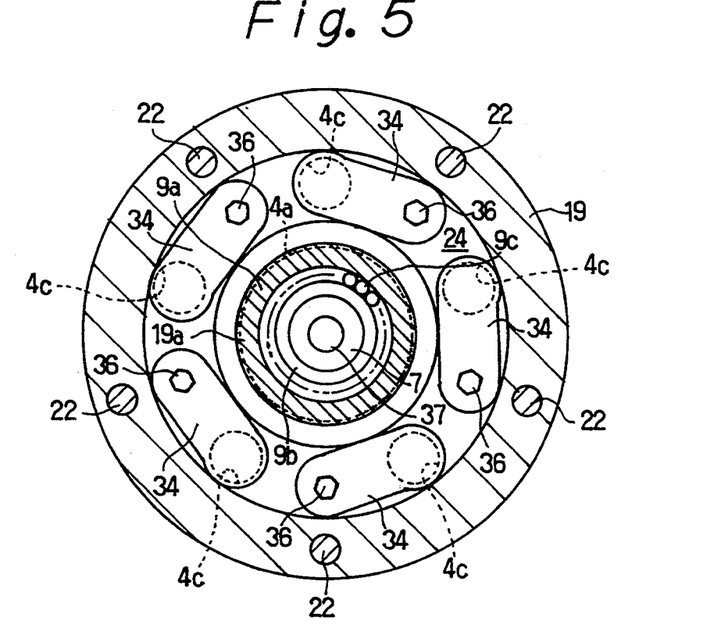
FIG. 5 is a cross-section which is similar to FIG. 4, but taken along line V—V of FIG. 1 through a rear housing of the compressor.

The front and rear housings 18, 19 cooperate with the valve plates 3, 4 to form therein discharge chambers 23, 24, respectively, which are communicable with the respective cylinder bores through discharge ports 3c, 4c formed through the valve plates. The valve plates 3, 4 include reed type discharge valves 31, 32 for controlling the flow of refrigerant gas discharged through the ports 3c, 4c into the respective discharge chambers and retainers 33, 34 for restricting the maximum degree of opening of the discharge valve reeds. As shown in FIGS. 4 and 5, each reed valve and its restrainer are fastened together to the valve plate by a bolt 35, 36. The discharge chamber 23 in the front housing 18 has a delivery passage 25 which is connected to an external delivery conduit (not shown).

As shown in FIG. 1, the front end of the drive shaft 7 extends through the front housing 18 and has a lip seal 26 mounted thereon for sealing the shaft against leakage of compressed refrigerant gas, while the opposite rear end extends into the rear housing 19. The drive shaft 7 has formed therein an axial central passage 37 which is opened at its rear end to the central or inner part of the rear discharge chamber 24 and at the opposite end to the central part of the front discharge chamber 23 surrounding the drive shaft through a plurality of holes 38 formed radially in the drive shaft so that the front and rear discharge chambers are in communication with each other through the axial passage 37 of the drive shaft, as will be described below.

The front and rear valve plates 3, 4 have formed in their bore defining projections a plurality of fluid passages 3d, 4d, each connecting the discharge chamber with an annular space formed round the enlarged section of the drive shaft 7 between the suction valve and the bearings and communicating with the adjacent central part of the discharge chamber through spaces between the rollers of the bearing. Thus, the front and rear discharge chambers 23, 24 are in communication with each other through the axial passage 37, holes 38 of the drive shaft 7. In such arrangement for fluid communication, compressed refrigerant gas forced out into the rear discharge chamber 24 flows through fluid passages 4d in the valve plate 4 and the bearing 9 into the central part of that discharge chamber, from where it flows through the axial and radial passages 37, 38 and enters into the central part of the front discharge chamber 23. Then, the gas passes through the bearing 8 and the fluid passages 3d and admitted into the front discharge chamber 23, from where it is delivered out through the delivery passage 25 together with gas discharged directly into the front discharge chamber. Therefore, all lubricating oil contained in refrigerant gas discharged into the rear discharged chamber 24 flows together therewith through both of the front and rear bearings 8, 9 for lubricating the same.

Figure 2:
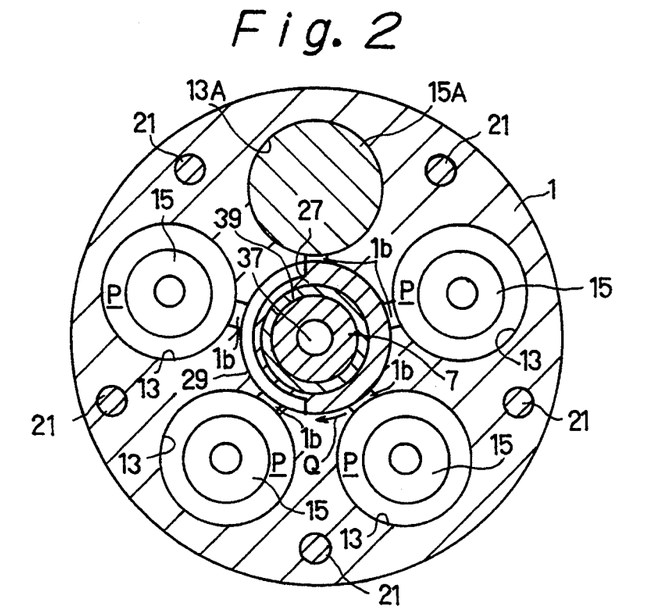
FIG. 2 is a cross-sectional view taken along line II—II of FIG. 1 through a front cylinder block and a front suction valve of the compressor.

The above-mentioned rotary suction valves 27, 28, which are accommodated in the bores 1a, 2a, are mounted on the enlarged sections 7a, 7b, of the drive shaft with seal rings 39, 40, respectively, for rotation with the drive shaft in the direction indicated by arrow Q in FIG. 2, The outer peripheries of the suction valves 27, 28 are cylindrically shaped, and the peripheries of their accommodating bores 1a, 2a are complementarily configured so that the valves fit sealingly in the accommodating bores. The suction valves 27, 28 have formed therein passages 29, 30 each having an inlet 29a, 30a which is in direct communication with the swash plate compartment 11, and an outlet 29b, 30b which is opened to the outer periphery of the suction valve and communicable with the cylinder bores, as will be explained below.

As shown in FIG. 1 and 2, as many suction ports 1b as the cylinder bores 13, 13A are formed obliquely in the cylinder block 1 at the same angularly spaced intervals as the cylinder bores. Each suction port 1b extends between its associated cylinder bore and the cylindrical periphery of the central bore 1a such that the fluid passage 29 in the rotatable suction valve 27 can be in registration with the suction port thereby to fluidly communicate the swash plate compartment 11 with the cylinder bore through the fluid passage 29 and the port 1b depending on where the piston is positioned in the cylinder bore. As understood readily from FIG. 3 which is similar to FIG. 2, suction ports 2b in the rear suction valve 28 are formed and operable in the same manner as the above suction ports 1b in the front suction valve 27.

Figure 3:
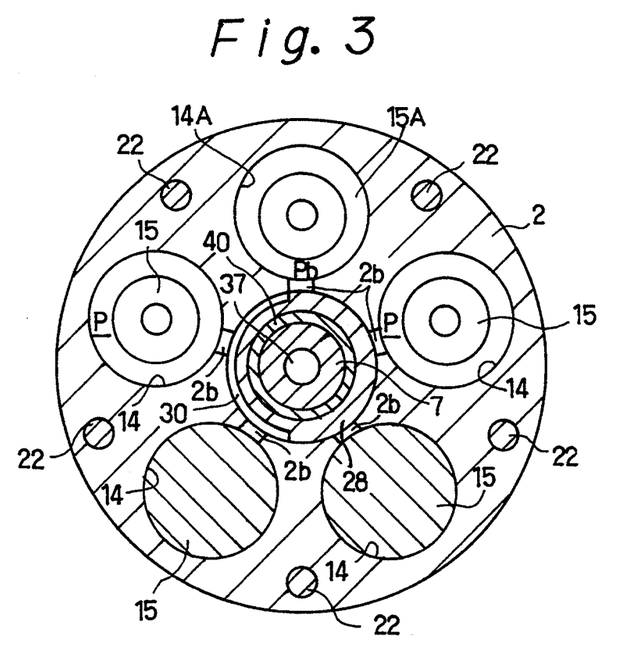
FIG. 3 is a cross-sectional view taken along line III—III of FIG. 1 through a rear cylinder block and a rear suction valve of the compressor.

In order to be more specific, reference is made to the state of the compressor shown in FIGS. 1, 2, and 3 where the double-headed piston 15A at the top as viewed in the drawings is located at its TDC (top dead center) with respect to the cylinder bore 13A and at its BDC (bottom dead center) with respect to the cylinder bore 14A. In this position of the piston 15A, the suction port 1b for the cylinder bore 13A is just about to be opened to the fluid passage 29 for communication with the swash plate compartment 11, as seen from FIG. 2, for drawing refrigerant gas into the fluid working chamber Pa in which the piston 15A is just about to move for its suction stroke. On the other hand, the suction port 2b for the cylinder bore 14A has just been closed by the rear suction valve 28, as shown in FIG. 3. That is, the fluid passage 30 of the rear suction valve 28 has just moved past the suction port 2b thereby to shut communication between the swash plate compartment 11 and the fluid working chamber Pb in which the piston 15A is just about to commence its compression and discharge stroke for compressing refrigerant gas which was previously drawn into that fluid working chamber. Such suction, compression and discharge of refrigerant gas are performed in the fluid working chambers P of the other paired cylinder bores 13, 14 in the same manner as in the chambers Pa, Pb.

The use of the rotary type suction valves 27, 28 in the above embodiment can offer various advantages over a conventional reed type suction valve as described below.

The rotary type suction valve used in the above embodiment can admit more refrigerant gas into a fluid working chamber during the suction stroke of a piston than a suction valve using a flexible reed which must overcome the resistance thereof when it is being resiliently deformed or bent by pressure differential to open a suction port, as well as the resistance which is caused by lubricating oil stuck to a seal surface with which the valve reed is in contact when closed and hence acting to delay the opening of the suction valve and restricting the flow of refrigerant gas to be admitted into the fluid working chamber. Thus, the rotary type suction valve which can admit more gas into the fluid working chamber for compression is advantageous over the reed type valve in terms of volumetric efficiency of the compressor. Furthermore, the suction valve in the embodiment can dispense with relatively long axial passages extending in the cylinder blocks to connect the swash plate compartment with the front and rear suction chambers, respectively, and causing a pressure loss of refrigerant gas passing therethrough. Because refrigerant gas under suction pressure in the swash plate compartment 11 can be drawn into the fluid working chamber through relatively short passages 1b, 2b in the suction valves, the pressure loss can be less as compared with that occurring in the prior art compressor having longer passages. Additionally, the rotary type suction valves according to the invention, which require no space for suction chambers in the front and rear housings as in the above-cited prior art compressor, can save spaces to accommodate therein bearings such as 8, 9 for supporting the drive shaft. Therefore, the bearings can be disposed so as to support the drive shaft at locations spaced apart at a longer distance, so that stability in drive shaft supporting can be improved without axially enlarging the compressor.

Provision of the central axial discharge passage 37 in the drive shaft 7 connecting the front and rear discharge chambers 23, 24 can do away with discharge passages extending in the cylinder block assembly as in the prior art compressor. Apparently, the absence of these discharge passages, as well as the above fluid passage, makes it possible to dispose the cylinder bores in such an arrangement that can permit the cylinder block assembly to be constructed smaller in size than heretofore. Thus, compactness and hence lightweightness of the compressor can also be accomplished without affecting its overall strength, It is to be understood that the present invention can be applied to a swash plate type compressor as shown in FIGS. 6, 7 and 8.

Figure 6:
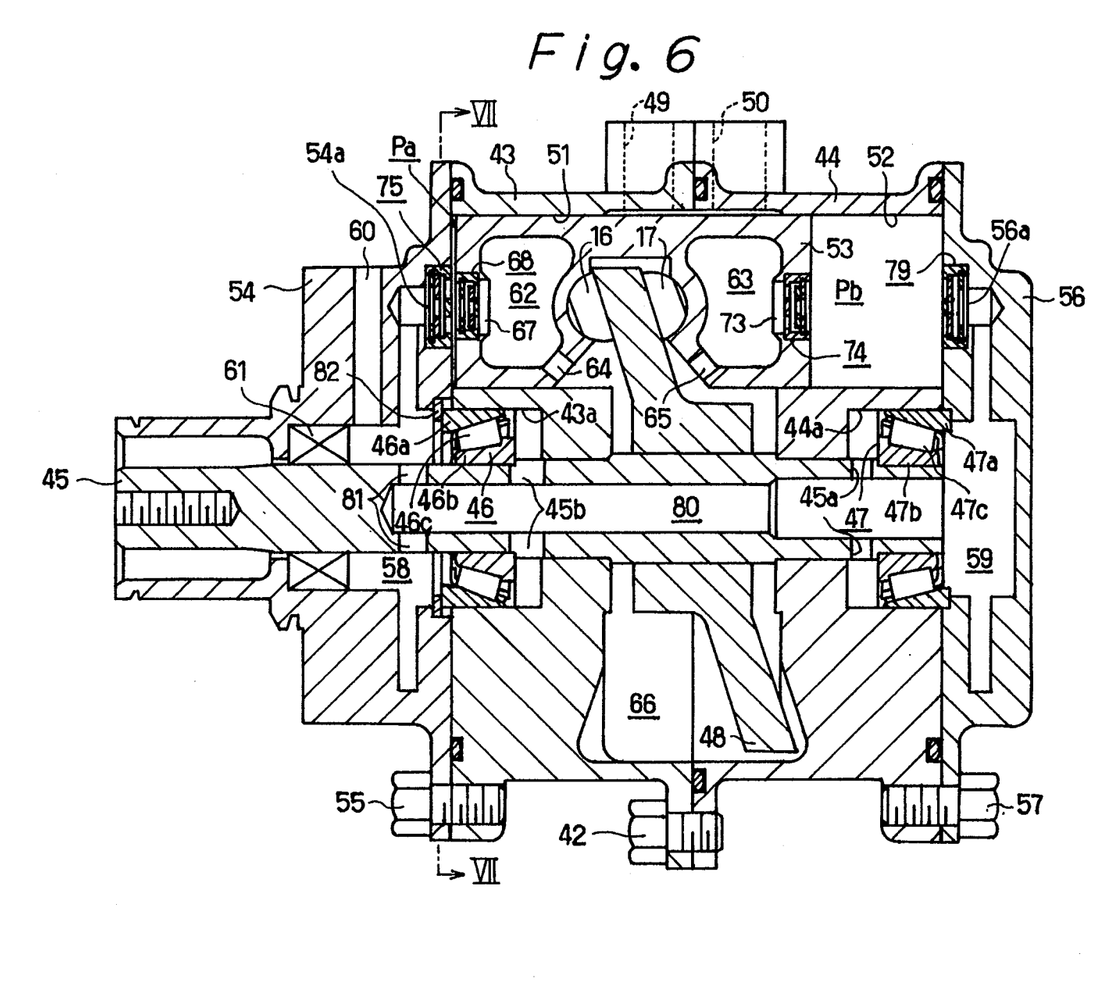
FIG. 6 is a longitudinal cross-sectional view of a modified embodiment of swash plate type refrigerant compressor according to the present invention.
Figure 7:
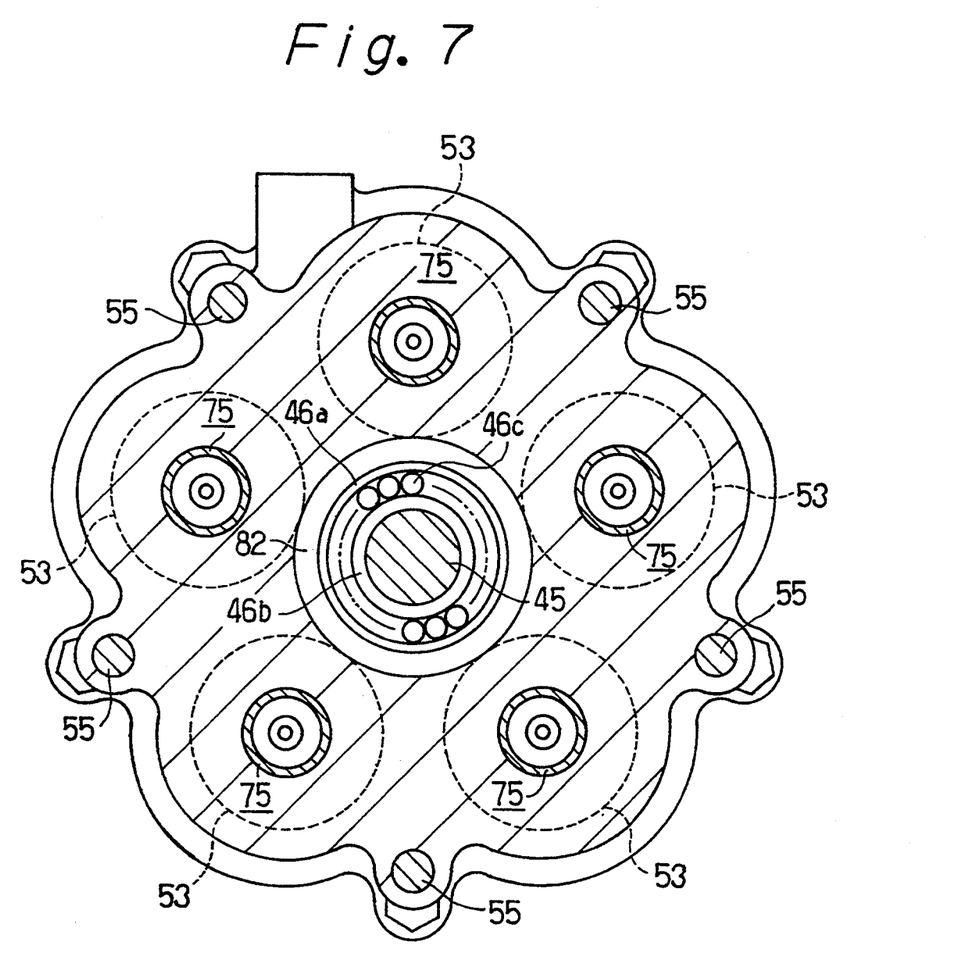
FIG. 7 is a cross-sectional view taken along line VII—VII of FIG. 6 through a front housing of the compressor.

Referring to FIG. 6, a drive shaft 45 is rotatably supported by a pair of tapered roller bearings 46, 47 accommodated in bores 43a, 44a formed centrally in a pair of front and rear cylinder blocks 43, 44 which are connected together by a plurality of bolts 42. Each of the bearings 46, 47 is supported in its corresponding bore 43a, 44a with an inner race 46b, 47b thereof fixed on the drive shaft 45 and with an outer race 46a, 47a in sliding contact with the periphery of the bore. There are provided refrigerant gas inlet fittings on the periphery of the cylinder blocks 43, 44 whose inlet ports 49, 50 are connected on one end to an external refrigerant gas conduit (not shown) and on the other to a swash plate compartment 66. The drive shaft 45 carries thereon a swash plate 48 to make rotational wobbling motion in the compartment 66. As indicated in FIG. 7, there are five pairs of aligned cylinder bores 51, 52 formed in the cylinder blocks 43, 44 and each paired aligned cylinder bores receiving therein a double-headed piston 53 which is caused to reciprocate the cylinder bores by virtue of the wobbling motion of swash plate 48 engaged with that piston by way of a pair of front and rear hemispherical shoes 16, 17. A front housing 54 is sealingly clamped to the front end of the front cylinder block 43 by bolts 55 and a rear housing 56 to the rear end of rear cylinder block 44 by bolts 57. With the rear housing 56 clamped to the cylinder block, the rear bearing 47 is installed to place with the outer end of its outer race 47a pressed in contact with the housing and the inner end of the inner race 47b with an annular shoulder portion formed on the drive shaft 45. Between the front housing 54 and the front bearing 46 is disposed an annular preloading spring 82 placed in contact at its outer edge with an annular shoulder portion on the front housing, and the front bearing 46 is set to place with the outer end of its outer race 46a pressed in contact with the preloading spring 82 and the inner end of the inner race 46b with an annular shoulder portion on the drive shaft. 45. The preloading spring 82 is resiliently deformed by tightening the bolts 55, thereby providing an axial preload to the drive shaft 45. Thus, radial load of the drive shaft 45 is carried directly by the paired bearings 46, 47 and thrust pressure thereof is received by the front and rear housings 54, 56 way of the two bearings. As seen in FIG. 6, the shoulder portions on the drive shaft for restricting axially inward displacement of the bearings are formed at such locations that annular cavities or spaces are defined round the drive shaft in the deepest region of the respective bores 43a, 44a, as viewed from the opposite housings. Both front and rear housings 54, 56 have formed therein discharge chambers 58, 59 which are communicable with the cylinder bores 51, 52 through discharge ports 54a, 56a formed in the housings. The front discharge chamber 58 has a delivery passage 60 which is connected to an external delivery conduit (not shown).

Each double-headed piston 53 has formed in its both opposite heads suction chambers 62, 63 which are in direct communication with the swash plate compartment 66 through inlet ports 64, 65 formed in the respective piston heads.

Figure 8:
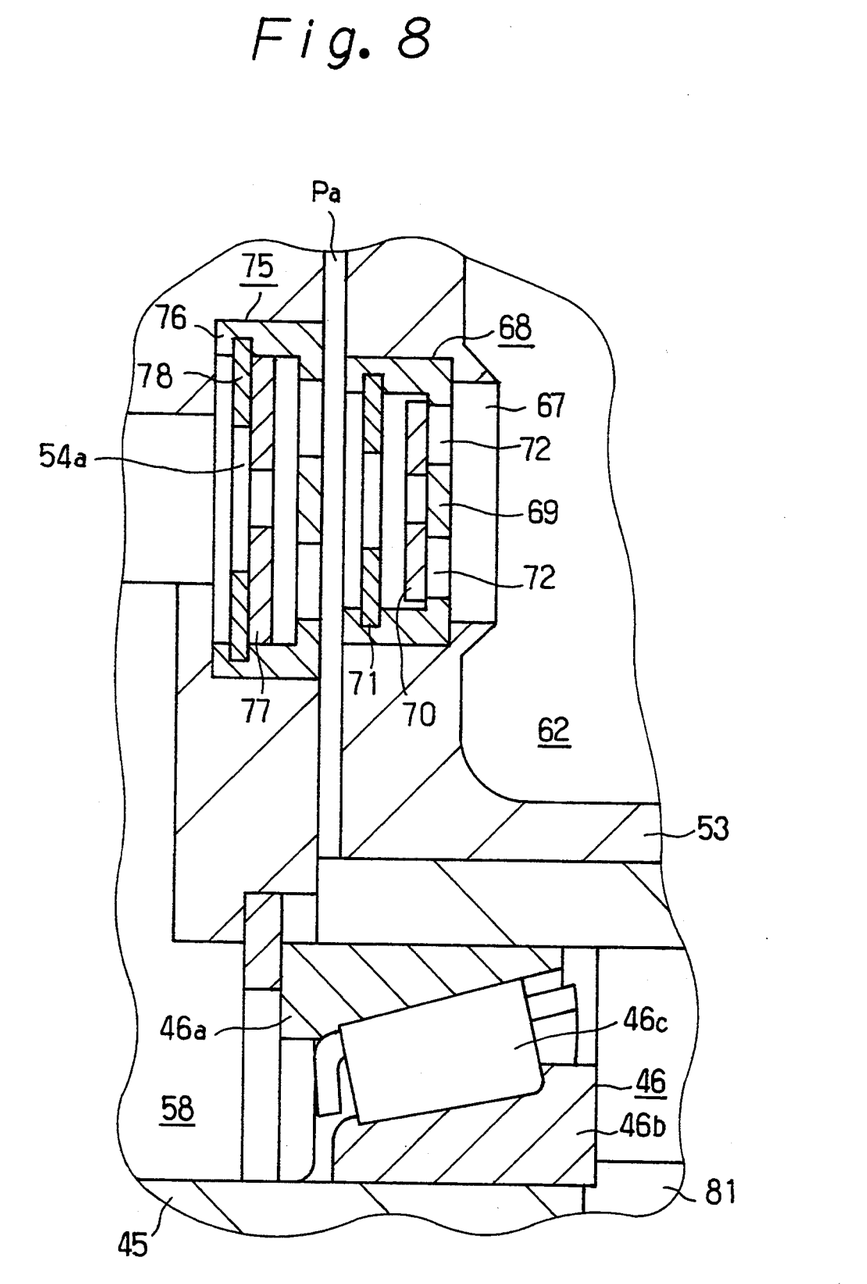
FIG. 8 is an enlarged view showing front suction and discharge valve assemblies and a front tapered roller bearing of the compressor of FIG. 6.

Referring to FIG. 8, front head of the piston 53 is formed through its front end with a suction port 67 in which a suction valve assembly 68 is fitted. The suction valve assembly 68 includes a valve seat 69 fixedly inserted in the suction port 67, a disc-shaped float valve 70 accommodated in the valve seat and a retainer 71 for retaining the float valve in the valve seat. The valve seat 69 has a port 72 which is opened by the float valve 70 when it is moved away from contact with the seat. The rear head of the piston (FIG. 6) has formed through its rear end a suction port 73 in which a suction valve assembly 74 is provided, which is constructed and operable in the same manner as the counterpart in the front head. The heads of the other pistons have the same suction valve assembly.

Reference being made again to FIG. 8, there is provided a discharge valve assembly 75 in the front discharge port 54a. The discharge valve assembly 75 includes a valve seat 76 fixedly inserted in the discharge port 54a, a disc-shaped float valve 77 accommodated in the valve seat and a retainer 78 for retaining the float valve in the valve seat. In FIG. 6, the same discharge valve assembly in the rear discharge port 56a is designated by reference numeral 79, and the other front and rear discharge ports have the same valve assembly. As shown in FIG. 8, the valve seat, float valve and retainer of each valve assembly are shaped similar, although the discharge valve assembly 75 is sized larger than the suction valve assembly 68.

During the suction stroke of the piston 53 with respect to the front cylinder bore 51, refrigerant gas in the suction chamber 62 is drawn into a fluid working chamber Pa through the suction port 67 with the float valve 70 then moved into contact with its retainer 71 thereby to open the port 72 in the valve seat 69. During the subsequent compression and discharge stroke of the piston with respect to the same front cylinder bore 51, refrigerant gas compressed in the fluid working chamber Pa is discharged through the discharge 54a with the suction port 67 then closed and the discharge port opened by the float valve 77. The same operation is performed in the fluid working chamber of each cylinder bore.

As shown in FIG. 6, the front end of the drive shaft 45 extends through the front housing 54 and has a lip seal 61 mounted thereon to seal the shaft, while the opposite end of the drive shaft extends to the discharge chamber 59 in the rear housing 56. The drive shaft 45 has formed therein an axial central passage 80 which is opened at its rear end to the rear discharge chamber 59 and at the opposite end to the front discharge chamber 58 through a plurality of holes 81 formed radially in the drive shaft. Thus, the front and rear discharge chambers 58, 59 are in direct communication with each other through the axial passage 80 and the holes 81, so that compressed refrigerant gas forced out into the rear discharge chamber 59 flows through the axial and radial passages to the front discharge chamber 58 from where it is delivered out through the delivery passage 60 together with gas compressed and discharged directly into the front discharge chamber.

The drive shaft 45 further has holes 45b, 45a formed radially therethrough adjacent the front and rear bearings 46, 47, respectively, in such a way that refrigerant gas passages are formed through the respective bearings which bypass part of the axial passage 80 in the drive shaft. That is, it is so arranged that part of the refrigerant gas forced out into the discharge chamber 59 is flown through the rear bearing 47, its adjacent cavity in the bore 44a, and the holes 45a then into the axial passage 80, and also that part of the refrigerant gas flowing in the axial passage is introduced through the holes 45b into the cavity in the bore 43a to pass through the front bearing 46 and then flown into the front discharge chamber 58.

As it is apparent from the foregoing description, both front and rear bearings 46, 47 can be lubricated appropriately by oil contained in and entrained by refrigerant gas flowing through the bearings. Furthermore, the swash plate type compressor according to the above second embodiment of the invention can dispense with axial suction and discharge passages extending in the cylinder blocks in the prior art compressor. Apparently, this makes it possible to dispose the cylinder bores in such an arrangement that can construct the cylinder block assembly smaller in size than heretofore. Additionally, omission of suction chambers on opposite sides of the cylinder block assembly can reduce the axial size of the compressor.

What is claimed is:

1. A swash plate type refrigerant compressor comprising:
   a cylinder block having formed therein a swash plate compartment and a plurality of cylinder bores each receiving therein a reciprocally movable double-headed piston,
   front and rear housings clamped to axial ends of said cylinder block and having formed therein front and rear discharge chambers, respectively, communicable with said cylinder bores,
   a drive shaft rotatably supported by a pair of front and rear bearings and having a swash plate accommodated in said awash plate compartment and fixedly mounted on said drive shaft at an angle of inclination so as to make a wobbling movement when driven to rotate by said drive shaft, each of said pistons being held by said swash plate by shoe means, whereby the wobbling movement of said swash plate is converted into reciprocal axial movement of each said piston in its associated cylinder bore,
   said drive shaft having formed therein a discharge passage in communication with said front and rear discharge chambers so that refrigerant gas discharged into one of said discharge chambers flows into the other discharge chamber through said discharge passage, and passage means for causing at least part of the refrigerant gas discharged into said one of said discharge chambers to flow through at least one of said bearings.

2. A swash plate type compressor according to claim 1, further comprising a valve plate disposed between each housing and its adjacent axial end of said cylinder block and having formed therein a central accommodation bore and a fluid passage in communication with the adjacent discharge chamber, each bearing being disposed in said accommodation bore of the valve plate such that each of said discharge chambers is in communication with said discharge passage through said fluid passage and the adjacent bearing.

3. A swash plate type compressor according to claim 2, wherein said front and rear bearings are tapered roller bearings each having an outer race, an inner race and a plurality of rollers disposed between said inner and outer races.

4. A swash plate type compressor according to claim 3, said drive shaft having first retaining means and said rear housing having on its inner surface supporting means, said rear bearing being disposed in said accommodation bore with inner and outer races held by said first retaining means and said supporting means, respectively.

5. A swash plate type compressor according to claim 4, wherein said first retaining means includes a shoulder portion formed on said drive shaft.

6. A swash plate type compressor according to claim 3, further comprising a preloading means disposed between said front housing and said front bearing, said drive shaft having second retaining means, said front bearing being disposed in said accommodation bore with its inner and outer races held by said second retaining means and said preloading means, respectively.

7. A swash plate type compressor according to claim 6, wherein said second retaining means includes a shoulder portion formed on said drive shaft and said preloading means includes a spring.

8. A swash plate type compressor according to claim 1, wherein said discharge passage includes an axial passage portion in communication with said rear discharge chamber and a radial passage portion in communication with said axial passage portion and said front discharge chamber.

9. A swash plate type compressor according to claim 8, said cylinder block further formed therein a pair of front and rear radially central bores, said compressor further comprising front and rear suction valves disposed in said front and rear central bores, respectively, each of said suction valves being mounted on said drive shaft for rotation therewith and having formed a fluid passage in communication with said swash plate compartment, and each said suction valve being operable to bring said fluid passage in communication with the cylinder bores successively in synchronism with rotation of said drive shaft.

10. A swash plate type compressor according to claim 9, said suction valves being disposed on said drive shaft at locations axially inward of said bearings.

11. A swash plate type compressor according to claim 1, said cylinder block further having formed therein a pair of front and rear central bores for accommodating therein said front and rear bearings, respectively, each of said bearings being disposed in its associated accommodation bore such that a spatial region is defined in said accommodation bore adjacent the axially inner side of the bearing, and said drive shaft having formed therein at least one hole providing communication between said spatial region and said discharge passage.

12. A swash plate type compressor according to claim 11, said drive shaft having first retaining means and said rear housing having on its inner surface supporting means, respectively, said rear bearing having inner and outer races and disposed in said accommodation bore with its inner and outer races held by said first retaining means and said supporting means, respectively.

13. A swash plate type compressor according to claim 12, wherein said first retaining means includes a shoulder portion formed on said drive shaft, and said supporting means includes an annular shoulder formed on said inner surface of said rear housing.

14. A swash plate type compressor according to claim 11, said drive shaft having second retaining means and said front housing having on its inner surface supporting means, respectively, said compressor further comprising a preloading spring disposed between said supporting means of said front housing and said front bearing, said front bearing having inner and outer races and disposed in said accommodation bore with its inner and outer races held by said second retaining means and said preloading spring, respectively.

15. A swash plate type compressor according to claim 14, wherein said second retaining means includes a shoulder portion formed on said drive shaft, and said supporting means of said front housing includes an annular shoulder formed on said inner surface thereof.

16. A swash plate type refrigerant compressor comprising:

a cylinder block having formed therein a swash compartment and a plurality of cylinder bores each receiving therein a reciprocally movable double-headed piston, front and rear housings clamped to axial ends of said cylinder block and having formed therein front and rear discharge chambers, respectively, communicable with said cylinder bores, a drive shaft rotatably supported by a pair of front and rear bearings and having a swash plate accommodated in said swash plate compartment and fixedly mounted on said drive shaft at an angle of inclination so as to make a wobbling movement when driven to rotate by said drive shaft, each of said pistons being held by said swash plate by shoe means, whereby the wobbling movement of said swash plate is converted into reciprocal axial movement of each said piston in its associated cylinder bore, said drive shaft having formed therein a discharge passage in communication with said front and rear discharge chambers so that refrigerant gas discharged into one of said discharge chambers flows into the other discharge chamber through said discharge passage, each of said bearings being disposed in a respective passage between its adjacent discharge chamber and said discharge passage so that all of said refrigerant gas discharged into said one of said discharge chambers flows through at least one of said bearings.

17. A swash plate type compressor according to claim 16, wherein said front and rear bearings are tapered roller bearings each having an outer race, an inner race and a plurality of rollers disposed between said inner and outer races.

18. A swash plate type refrigerant compressor comprising:

a cylinder block having formed therein a swash plate compartment and a plurality of cylinder bores each receiving therein a reciprocally moveable double-headed piston, front and rear housings clamped to axial ends of said cylinder block and having formed therein front and rear discharge chambers, respectively, communicable with said cylinder bores, a drive shaft rotatably supported by a pair of front and rear bearings and having a swash plate accommodated in said swash plate compartment and fixedly mounted on said drive shaft at an angle of inclination so as to make a wobbling movement when driven to rotate by said drive shaft, each of said pistons being held by said swash plate by shoe means, whereby the wobbling movement of said swash plate is converted into reciprocal axial movement of each said piston in its associated cylinder bore, said drive shaft having formed therein a discharge passage in communication with said front and rear discharge chambers so that refrigerant gas discharged into of said discharge chambers flows into the other discharge chamber through said discharge passage, each of said bearings being located in a respective passage between its adjacent discharge chamber and said discharge passage so that part of said refrigerant gas discharged into said one of said discharge chambers flows through at least one of said bearings.

19. A swash plate type compressor according to claim 18, wherein said front and rear bearings are tapered roller bearings each having an outer race, an inner race and a plurality of rollers disposed between said inner and outer races.

* * * * *

UNITED STATES PATENT AND TRADEMARK OFFICE
CERTIFICATE OF CORRECTION

PATENT NO. : 5,368,450
DATED : November 29, 1994
INVENTOR(S) : T. Fujii et al

Page 1 of 2

It is certified that error appears in the above-indentified patent and that said Letters Patent is hereby corrected as shown below:

Column 2, line 7, "wall of" should read --of wall--;
line 50, after "of" insert --the--.

Column 3, line 10 after "of" insert --the--; line 65 after "pressor:" change colon to semi-colon --;--.

Column 7, line 60 after "strength" change comma to period --.--; line 61, after "can" insert --also--.

Column 8, line 16 after "of" (second occurrence) insert --the--.

Column 10, line 23 "awash" should read --swash--.

Column 11, line 16 after "further" insert --having--;
line 21, after "formed" insert --therein--.

Column 12, line 3, after "swash" insert --plate--;
line 63 after "into" insert --one--.

UNITED STATES PATENT AND TRADEMARK OFFICE
CERTIFICATE OF CORRECTION

PATENT NO.  : 5,368,450
DATED       : November 29, 1994
INVENTOR(S) : T. Jujii et al It is certified that error appears in the above-indentified patent and that said Letters Patent is hereby corrected as shown below:

Column 11, line 16 after "further" insert --having --.
          line 21, after "formed" insert --therein --.

Column 12, line 3, after "swash" insert --plate --
          line 63, after "into" insert --one --.

Signed and Sealed this

Twenty-fifth Day of April, 1995

Attest:

BRUCE LEHMAN

Attesting Officer      Commissioner of Patents and Trademarks